(12) United States Patent
Eisermann et al.

(10) Patent No.: US 11,196,118 B2
(45) Date of Patent: Dec. 7, 2021

(54) ENERGY STORAGE MODULE AND ASSEMBLY METHOD

(71) Applicant: Johnson Controls Advanced Power Solutions GmbH, Hannover (DE)

(72) Inventors: Henning Eisermann, Uetze (DE); Benjamin Schwarzien, Gehrden (DE); Joerg Birkholz, Sarstedt (DE); Marco Jansen, Celle/Groß Hehlen (DE); Ralf Joswig, Buchholz/Aller (DE)

(73) Assignee: CLARIOS ADVANCED SOLUTIONS GMBH, Hannover (DE)

( * ) Notice: Subject to any disclaimer, the term of this patent is extended or adjusted under 35 U.S.C. 154(b) by 134 days.

(21) Appl. No.: 16/332,787

(22) PCT Filed: Oct. 6, 2017

(86) PCT No.: PCT/EP2017/075488
§ 371 (c)(1),
(2) Date: Mar. 12, 2019

(87) PCT Pub. No.: WO2018/065580
PCT Pub. Date: Apr. 12, 2018

(65) Prior Publication Data
US 2019/0221798 A1    Jul. 18, 2019

(30) Foreign Application Priority Data

Oct. 6, 2016  (DE) ..................... 10 2016 118 977.4

(51) Int. Cl.
*H01M 2/10* (2006.01)
*H01M 2/20* (2006.01)
(Continued)

(52) U.S. Cl.
CPC ......... *H01M 50/20* (2021.01); *H01M 50/502* (2021.01); *H01M 2220/20* (2013.01)

(58) Field of Classification Search
CPC ............... H01M 50/20; H01M 50/502; H01M 2220/20; Y02E 60/10
See application file for complete search history.

(56) References Cited

U.S. PATENT DOCUMENTS

| 1,259,193 A | * | 3/1918 | Ahlgren | ................ H01M 50/54 429/161 |
| 5,424,149 A | * | 6/1995 | Imhof | ................... H01M 50/54 429/161 |

(Continued)

FOREIGN PATENT DOCUMENTS

| CN | 202585590 U | 12/2012 |
| CN | 105514498 A | 4/2016 |

(Continued)

OTHER PUBLICATIONS

International Search Report for PCT/EP2017/075488 dated Jun. 12, 2017, 2 pages.

(Continued)

*Primary Examiner* — Lisa S Park
(74) *Attorney, Agent, or Firm* — Christopher & Weisberg, P.A.

(57) ABSTRACT

The invention relates to an energy storage module comprising a plurality of electrochemical cells for storing electric energy and comprising at least one contacting device for electrically contacting the plurality of electrochemical cells. Each of the plurality of electrochemical cells has a first flat connection lug for contacting a first electrode of the respective electrochemical cell and a second flat connection lug for contacting a second electrode of the respective electrochemical cell. The plurality of electrochemical cells are arranged in a stacked formation and form a cell pack such that the first and second flat connection lugs extend outwards from two opposing sides of the cell pack in an at least substantially perpendicular manner. According to the inven- (Continued)

tion, the at least one contacting device is substantially comb-shaped in particular and has a plurality of teeth which are formed and arranged such that a first or second connection lug is received or can be received between two adjacent teeth.

18 Claims, 5 Drawing Sheets

(51) Int. Cl.
  *H01M 50/20* (2021.01)
  *H01M 50/502* (2021.01)

(56) References Cited

U.S. PATENT DOCUMENTS

| | | | |
|---|---|---|---|
| 9,225,035 B1 | 12/2015 | Werre et al. | |
| 2012/0009461 A1* | 1/2012 | Kim | H01M 50/502 429/158 |
| 2014/0242429 A1* | 8/2014 | Lee | H01M 10/613 429/61 |
| 2014/0363720 A1* | 12/2014 | Ackermann | H01M 10/6556 429/120 |
| 2015/0221921 A1* | 8/2015 | Choi | H01R 9/2458 429/158 |

FOREIGN PATENT DOCUMENTS

| | | |
|---|---|---|
| DE | 102014102508 A1 | 8/2014 |
| EP | 2752918 A1 | 7/2014 |
| KR | 20150055255 A | 5/2015 |
| WO | 2015152527 A1 | 10/2015 |
| WO | 2015152637 A1 | 10/2015 |
| WO | WO2015/152527 * | 10/2015 |

OTHER PUBLICATIONS

Chinese Office Action and Search Report with English Machine Translation dated Mar. 31, 2021 for Patent Application No. 2017800610663 filed Apr. 1, 2019, consisting of 38-pages.

Jiuchun Jiang et al.; Application Technology of Electrical Vehicle Power Battery; Beijing Jiaotong University Press, Jun. 30, 2016, consisting of 3-pages.

Jiaxiang Wang et al.; Welding, Assembly and Debugging of Circuit Board; Xidian University press, Jan. 31, 2016, consisting of 3-pages.

* cited by examiner

ENERGY STORAGE MODULE AND ASSEMBLY METHOD

CROSS REFERENCE TO RELATED APPLICATIONS

This application is a U.S. National Stage Application under 35 U.S.C. § 371 of International Application No. PCT/EP2017/075488 entitled "ENERGY STORAGE MODULE AND ASSEMBLY METHOD," filed on Oct. 6, 2017, which claims priority to and the benefit of Application No. DE 102016118977.4, filed Oct. 6, 2016, which are hereby incorporated by reference in their entirety for all purposes.

DESCRIPTION

The present invention relates to an energy storage module in accordance with the preamble of the first patent claim. The invention furthermore relates to a method for assembling an energy storage module.

Energy storage modules of this kind are used in many sectors of engineering. In particular, the present invention relates to the sector of energy storage modules for vehicles, wherein a vehicle can be an aircraft or watercraft, a rail vehicle, an all-terrain vehicle or preferably a road vehicle. Road vehicles means especially passenger vehicles, trucks, buses or motor homes. Different types of battery modules are installed in vehicles, including traction batteries (especially in the case of electric vehicles) and starter batteries (automobile batteries). A starter battery will be defined below particularly by the fact that it supplies at least some of the energy, preferably all of the energy, which is necessary to start a vehicle and/or to supply systems within the vehicle (lighting, pumps, ignition). Lead accumulators are generally used as starter batteries, but these have a high weight, particularly because of their low energy densities. Lithium-ion accumulators, on the other hand, have a high energy density. Moreover, lithium-ion accumulators have a longer service life, lower spontaneous discharge, improved capacity for quick charging and a lower maintenance requirement than conventional lead accumulators.

Overall, particularly due to the rising number of energy consuming units, ever greater demands are being made on the performance, weight, reliability and production costs of battery modules in vehicles.

It is therefore the underlying object of the invention to make an energy storage module more suitable for series production, in particular large-scale series production, particularly as regards automated production processes in applications for automotive engineering. It is furthermore an object of the present invention to configure an energy storage module in such a way that, on the one hand, it can expediently be used in modular production processes and that, on the other hand, it is particularly well-suited for subsequent use in vehicles. The intention is furthermore to specify an improved method for assembling such energy storage modules.

According to patent claim 1, this object is achieved by an energy storage module which has a multiplicity of electrochemical cells for storing electric energy and at least one contacting device for electrically contacting the multiplicity of electrochemical cells. In this case, each of the multiplicity of electrochemical cells has a first flat connection lug for contacting a first electrode of the respective electrochemical cell and a second flat connection lug for contacting a second electrode of the respective electrochemical cell. The multiplicity of electrochemical cells is arranged in a stacked formation and forms a cell pack in such a way that the first and second flat connection lugs extend from two opposing sides of the cell pack in an at least substantially perpendicular manner. In this case, the at least one contacting device is substantially comb-shaped and has a multiplicity of teeth, which are designed and arranged in such a way that a first or a second connection lug can be received or is received between two adjacent teeth.

The term "flat connection lug" and the abbreviated form "connection lug" are used synonymously.

The energy storage module is preferably a starter battery for a vehicle and, particularly preferably, the electrochemical cells are lithium-ion cells, thereby making it possible to achieve the initially mentioned advantages of lithium-ion cells in comparison with lead accumulators. The lithium-ion cell is preferably designed as a pouch cell.

By virtue of the proposal according to the invention, to design the cell pack in such a way that the first and second flat connection lugs extend from two opposing sides of the cell pack in an at least substantially perpendicular manner, and to make the contacting device (at least) substantially comb-shaped, an extremely compact construction is achieved, which can be assembled in a simple manner, that is to say in few and/or uncomplicated steps. At the same time, however, extremely reliable and good contact between the electrochemical cells and the contacting device can also be achieved.

In this context, from one side of the cell pack in a perpendicular manner means that the angle between the side of the cell pack and the respective connection lug is within a range of 70 degrees to 110 degrees, preferably within a range of 80 degrees to 100 degrees, and particularly preferably within a range of 85 degrees to 95 degrees. In particular, there is of course an extremely great preference in this context for the angle to be 90 degrees.

According to an advantageous development of the invention, the energy storage module has two contacting devices, wherein a first of the two contacting devices makes contact with connection lugs on a first side of the two opposing sides of the cell pack, and wherein a second of the two contacting devices makes contact with connection lugs on a second side of the two opposing sides of the cell pack.

It is accordingly possible to push on or mount the first contacting device on the first side of the two opposing sides of the cell pack and to push on or mount the second contacting device on the second side of the two opposing sides of the cell pack.

Through different arrangements of the electrochemical cells or, to be more precise, the alignment of the connection lugs thereof relative to a first or second side of the two opposing sides of the cell pack, it is possible to connect individual cells or groups of individual cells in parallel or in series.

According to an advantageous development of the invention, each of the first and second flat connection lugs is received between two adjacent teeth of the at least one contacting device.

It is thus possible to electrically connect each individual one of the connection lugs to the contacting device in a subsequent working step. The proposal according to the invention thus makes available particularly quick and efficient assembly of an energy storage module, in particular by virtue of the fact that the comb-shaped contacting device can be pushed onto the connection lugs of the electrochemical cells. It is therefore possible with just a few movements to assemble the energy storage module or prepare it for a subsequent assembly step.

Furthermore, the teeth interact with the connection lugs as a kind of centering device and thus further facilitate assembly. Of course, it is conceivable in this context for further centering devices to be provided, in particular on the contacting device.

Further advantages are also obtained by the fact that, when using pouch cells, these can be formed directly into a cell pack. This means that it is no longer necessary, for example, to connect a plurality of pouch cells by a preceding assembly step. In particular, the use of the energy storage module is thereby also made more universal overall since the individual cells or the connection lugs thereof can be aligned differently relative to one another. It is thus not necessary to determine in advance whether series or parallel connection of individual cells should be achieved.

It is also no longer necessary to use pouch cells with connection lugs of different designs suitable for bundling by virtue of their different design. Moreover, use of individual contacting devices, i.e. an associated contacting device for each connection lug, is also prevented, and the number of parts decreases.

Overall, both the costs and the cycle time for production fall significantly. In this context, cycle time means the period of time which passes during the production of a product between the start of the first work process and the conclusion of the last work process.

According to an advantageous development of the invention, the at least one contacting device has at least one busbar and at least one carrier, wherein the at least one busbar and the at least one carrier are comb-shaped and have the multiplicity of teeth.

Thus, the contacting device is likewise of modular construction, further increasing the modularity of the overall system since different busbars can be installed. More possibilities for assembly (the number of variants rises) and, at the same time, less restriction (decisions in advance) thus arise.

Furthermore, the stability of the contacting device is increased by the at least one carrier, which can also have further centering or installation aids.

A separation of functions is furthermore aimed at by the proposal according to the invention, to construct the contacting device from at least one busbar and at least one carrier. In this respect, the at least one busbar performs the function of an electrical contacting device, and the at least one carrier performs the function of a holder or of a fastening device and/or of a centering or positioning device.

It is thereby possible, in particular, to design or configure the contacting device in such a way that only the at least one busbar is formed from electrically conductive material, whereas the contacting device can be formed from an electrically nonconductive material. It is thus possible to separate current-carrying regions from regions which do not carry a current. Examples of materials that can be considered here for the at least one carrier are an acrylonitrile butadiene styrene, a polycarbonate, a polyamide, polyvinyl chloride, polyethylene terephthalate, polyoxymethylene or a copolymer thereof.

According to an advantageous development of the invention, the at least one busbar can be received or is received in the at least one carrier and/or can be secured or is secured thereon.

Thus, assembly is further simplified, especially if the at least one carrier has defined regions in which the at least one busbar can be received. Such regions can be implemented by means of an outer contour of the carrier and/or by means of webs, for example. In particular, it is thus also ensured that the busbar is connected to the at least one carrier in a particular and envisaged manner. Joining means, in particular adhesives, preferably those in the form of adhesive strips, are suitable for securing.

According to an advantageous development of the invention, the at least one contacting device has a multiplicity of busbars, wherein the multiplicity of busbars has a first multiplicity of busbars made from a first material and a second multiplicity of busbars made from a second material, and wherein the first material differs from the second material.

By means of the proposal according to the invention, account is taken of the different material requirements in the contacting of positive and negative electrodes. In lithium-ion cells, electric contact pieces made of aluminum are normally used for contacting on the positive electrode side, whereas copper, nickel or nickel-plated copper are used on the negative electrode side since, if aluminum were used on the negative electrode side, alloying of lithium and aluminum would otherwise occur owing to the applicable potential. Accordingly, busbars which make contact with the positive electrode side or the connection lug of the positive electrode side are preferably produced from aluminum, and busbars which may contact with the negative electrode side or the connection lug of the negative electrode side are preferably produced from copper, nickel or nickel-plated copper.

In addition, at least one of the multiplicity of busbars can have a sensor connection, in particular for a temperature sensor and/or current sensor.

As a particular preference, a first busbar of the multiplicity of busbars and a second busbar of the multiplicity of busbars have already been welded in a preceding working step. In order to weld a first busbar made from a first material and a second busbar made from a second material, it may be necessary to use a bimetallic plate to simplify the welding process. Particularly when welding copper and aluminum, this is very worthwhile. Accordingly, the contacting device can additionally have a bimetallic plate.

According to an advantageous development of the invention, the at least one carrier and/or the at least one busbar have/has centering devices. Of course, it is conceivable in this context that the bimetallic plate could also have a centering device.

These centering devices are preferably provided by holes and associated pins, wherein, as a particular preference, the at least one busbar and, where applicable, the bimetallic plate have holes and the at least one carrier has pins. At the same time, the centering devices make it possible to configure assembly in accordance with the "Poka Yoke" principle, in such a way that the centering devices predetermine assembly. This means that a busbar can be arranged only in a particular alignment or only in a particular region of the carrier.

According to an advantageous development of the invention, the at least one busbar has a connection region for the electric contacting of an electric consuming unit.

In this sense, the connection to the consuming unit does not have to be direct. On the contrary, at least one further electric connection member can be arranged between the consuming unit and the energy storage module, for example.

The connection region is preferably arranged at an upper end, i.e. at an end of the busbar remote from the teeth. Thus, a particularly easily accessible connection region of the busbar can be implemented.

According to an advantageous development of the invention, the teeth of the at least one carrier and/or the teeth of the at least one busbar have chamfered end regions.

This too is conducive to configuration in a manner which is appropriate for assembly. Accordingly, the insertion, mounting or pushing on of the contacting device is simplified overall. Moreover, tilting is prevented in an effective manner by means of the connection lugs of the electrochemical cells.

According to an advantageous development of the invention, the teeth of the at least one carrier have chamfered end regions and the teeth of the at least one busbar do not extend as far as the chamfered end regions of the teeth of the at least one carrier when the at least one busbar is received in the at least one carrier and/or is secured thereon.

The proposal according to the invention thus, on the one hand, continues to provide the advantages of a chamfered end region, in particular simplification of assembly, and, on the other hand, reduces the outlay since only the teeth of the at least one carrier have chamfered end regions. Accordingly, it is no longer necessary to expensively chamfer the busbars. When using a plastic material for the carrier, a particularly simple embodiment of the chamfered end regions, e.g. by means of a correspondingly shaped casting mold, is furthermore possible.

According to an advantageous development, the at least one carrier has a multiplicity of holes, wherein the at least one busbar has a multiplicity of associated holes, wherein the holes in the carrier are in alignment with the holes in the busbar when the at least one busbar is received in the carrier and/or is secured thereon.

At least some, in particular each, of the holes of the multiplicity of holes in the busbar are/is preferably provided in the connection region to enable the latter to be secured in a stable manner.

Furthermore, holes can also serve additionally or exclusively to provide a means of securing various sensors. This can be implemented in a simple manner particularly when the sensors have connections with annular tongues. Of course, appropriate fastening means, especially screws, rivets or bolts, are also provided in this context.

According to an advantageous development of the invention, a threaded plate having a plurality of holes is arranged and aligned in such a way between the at least one carrier and the at least one busbar that the holes in the threaded plate are in alignment with the holes in the carrier and the holes in the busbar.

The threaded plate is preferably likewise provided in the connection region in order to support and stabilize the latter and/or to provide a fastening means. Moreover, such an arrangement makes it possible for fastening means, e.g. screws or bolts, to be connected to the contacting device. In particular, it is now no longer necessary to provide threaded holes in the at least one busbar or the at least one carrier, thereby, in turn, making it possible to save costs.

According to an advantageous development of the invention, the connection lugs of the multiplicity of electrochemical cells are flexible.

In particular, this offers the advantage that a relatively large contact surface can be provided between the individual connection lugs and the contacting device or the at least one busbar. Thus, reliable and large-area contacting is made possible.

According to an advantageous development of the invention, the cell pack has cell carriers to receive the multiplicity of electrochemical cells and arrange them in a stacked formation.

Here, a carrier is assigned to each pair of electrochemical cells, i.e. the cell carrier is designed in such a way that it can receive two electrochemical cells.

Overall, this is extremely advantageous also for the production sequence since the cell carriers can be prepared and fitted with one, preferably two, electrochemical cells in a preceding working step or at a preceding workstation. Work sequences can thus in general be further simplified and optimized.

On the other hand, the cell carriers can be designed in such a way that they have a multiplicity of devices which simplify subsequent assembly. In this context, it is possible, for example, for a lower region of the cell carriers to be designed in such a way that the at least one contacting device can be at least partially inserted into it and/or received therein. In this way, it is also possible to provide a stop for a lower region of the contacting device, i.e. for the teeth, thereby enabling exact positioning of the contacting device.

Furthermore, centering devices and/or latching devices can be provided to simplify assembly and, in particular, to enable the contacting device to be inserted and/or held in a simple manner.

According to an advantageous development of the invention, the cell pack has two end plates, which are provided at both ends of the electrochemical cells arranged in a stacked formation.

Thus, when cell carriers are used, the two end plates are arranged adjoining the cell carriers and form a front and rear end, respectively, of the cell pack.

The end plates and/or cell carriers are preferably made from plastic, in particular from an acrylonitrile butadiene styrene, a polycarbonate, a polyamide, polyvinyl chloride, polyethylene terephthalate, polyoxymethylene or a copolymer thereof.

According to an advantageous development of the invention, the cell carriers have holes, wherein the end plates have associated holes, which are arranged and aligned in alignment with the holes in the cell carriers, wherein the cell pack furthermore has a multiplicity of rods, which can be passed through the holes in the cell carriers and in the end plates in order to connect these.

Overall, an extremely stable and modular construction of the cell pack is thus formed. Here too, it is once again possible to provide for assembly of the cell pack at a separate workstation in order to further optimize the production sequence. Thus, at a first workstation, for example, an assembled cell carrier having in each case at least one cell, preferably two cells, can be assembled and, at a subsequent second workstation, the cell carriers together with the end plates can be connected to form a cell pack, which can then be transferred to a third workstation.

Four holes are preferably provided in each cell carrier and in each end plate, and, as a particular preference, these holes can be provided on both sides of the cell pack, from which the connection lugs of the electrochemical cells do not extend; i.e. on a top side and a bottom side of the cell pack.

The described arrangement of the cell pack with a multiplicity of rods is also advantageous because the rods perform a centering function together with the holes.

The rods preferably have threads on the end regions thereof to enable fastening means to be screwed on.

According to an advantageous development of the invention, a foam plate is in each case provided between an outer cell carrier, i.e. a front and a rear cell carrier, and one of the end plates.

By means of the proposal according to the invention, it is possible to ensure that a contact pressure which is exerted by the end plates on the cell pack or the cell carriers is uniformly distributed. In addition, the foam plates have a damping effect, thereby enabling the cell pack and, in particular, the electrochemical cells to be protected from vibrations and/or shocks.

The foam plate is preferably secured by means of an adhesive, wherein, as a particular preference, the foam plates are adhesively bonded to the end plates.

According to an advantageous development of the invention, the energy storage module furthermore has a module housing and a lid.

Here too, screws, bolts or rivets, in particular, are suitable fastening means for the module housing and the lid. In this context, the lid and/or the module housing are/is connected to the end plates of the cell stack, which have holes or threaded holes for this purpose.

A multiplicity of devices is provided on the lid, e.g. connections for sensors used in the energy storage module, ventilation devices and terminals for contact with an electric consuming unit. The terminals for contact with an electric consuming unit are connected electrically to the connection region or connection regions of the at least one busbar.

The object stated at the outset is furthermore achieved, in accordance with claim 19, by a method for assembling an energy storage module, wherein the method has the following steps: arranging a multiplicity of electrochemical cells in a stacked formation to form a cell pack, wherein each of the multiplicity of electrochemical cells has a first flat connection lug for contacting a first electrode of the respective electrochemical cell and a second flat connection lug for contacting a second electrode of the respective electrochemical cell, and wherein the cell pack is designed in such a way that the first and second flat connection lugs extend from two opposing sides of the cell pack in an at least substantially perpendicular manner; pushing at least one first contacting device onto flat connection lugs on a first side of the two opposing sides of the cell pack, wherein the at least one first contacting device is substantially comb-shaped and has a multiplicity of teeth, which are designed and arranged in such a way that a respective connection lug can be received or is received between two adjacent teeth.

This provides simple and, above all, quick assembly, in particular by virtue of the fact that the comb-shaped contacting device is pushed or mounted onto connection lugs of the electrochemical cells.

According to an advantageous development of the invention, the method furthermore has the following step: pushing at least one second contacting device onto flat connection lugs on a second side of the two opposing sides of the cell pack, wherein the at least one second contacting device is substantially comb-shaped and has a multiplicity of teeth, which are designed and arranged in such a way that a respective connection lug can be received or is received between two adjacent teeth.

According to an advantageous development, the connection lugs have a protective film and the method for the assembly of an energy storage module furthermore has the following step: removing the protective film from the connection lugs of the multiplicity of electrochemical cells.

The protective film protects the connection lugs during the assembly of the energy storage module. In particular, the surface of the connection lugs is protected from surface damage, e.g. scratches, in order to maintain as level a surface as possible of the connection lugs.

In addition, unintentional contacting of the connection lugs can be prevented by the protective film, thereby also increasing the safety of working at the respective workstation.

According to an advantageous development of the invention, the method furthermore has the following step: bending the connection lugs in such a way that the electrochemical cells can be electrically connected or are electrically connected to the at least one first and/or the at least one second contacting device.

By virtue of the fact that the connection lugs are flat, a particularly large contact surface is obtained after bending.

According to an advantageous development of the invention, the at least one first and/or the at least one second contacting device have/has at least one busbar and at least one carrier, wherein the at least one busbar and the at least one carrier are comb-shaped and have a multiplicity of teeth.

According to an advantageous development of the invention, the cell pack has cell carriers for receiving the multiplicity of electrochemical cells and arranging them in a stacked formation and has two end plates which are provided at both ends of the electrochemical cells arranged in a stacked formation.

According to an advantageous development, the method furthermore has the following step: welding the connection lugs of the multiplicity of electrochemical cells to the at least one first and/or the at least one second contacting device, using a welding tool.

The proposal according to the invention is advantageous particularly because a large contact or connecting surface between the connection lugs and the contacting device can be created within a short period of time by welding. Thus, welding can be used particularly effectively in automated production processes by virtue of the short processing time and, at the same time, is extremely reliable. Moreover, it is possible to dispense with further connecting components, e.g. screws, and the construction is furthermore simplified. The electric resistance in the case of a welded joint is also significantly lower than in the case of a joint provided by screws, for example.

According to an advantageous development of the invention, the welding tool and/or the cell carriers is/are designed in such a way that the welding tool can be received at least partially in the cell carriers or can be inserted at least partially into the cell carriers.

Of course, the cell carriers in this context have devices which simplify or enable reception or insertion of the welding tool. A corresponding illustrative device is in the form of a gap.

By means of the proposal according to the invention, accurate arrangement of the welding tool in relation to the contacting device or the connection lugs is possible. Accordingly, it is possible here too to avoid errors in production and to weld the contacting device to the connection lugs at predetermined points.

The invention is explained in greater detail below by means of illustrative embodiments using the attached drawings.

In the drawings:

FIG. 3b shows a schematic representation of an assembled contacting device shown in FIG. 3a;

The energy storage module according to the invention is described in greater detail below with reference to the illustrations in the figures. Here, identical or equivalent elements and functions are provided with the same or similar reference characters.

The cell pack, the contacting device and the energy storage module are described in such a way below that relative terms relate to the installed state of the energy storage module. Thus, for example, "in an upper region" means in a region which is at the top when viewed in the installed state and "in a lower region" means in a region which is at the bottom when viewed in the installed state.

Figure 1:
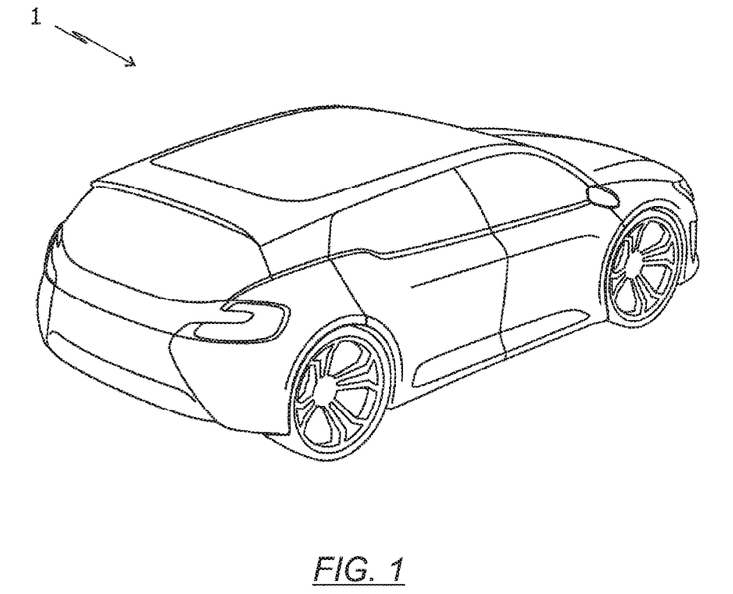
FIG. 1 shows a schematic representation of a vehicle.

FIG. 1 shows a schematic representation of a vehicle 1. Here, an energy storage module 10 can, in particular, be arranged in a region of the vehicle 1 which is at the front in the direction of travel.

The vehicle 1 can be an aircraft or a watercraft, a rail vehicle, an all-terrain vehicle, or preferably a road vehicle, wherein a road vehicle can mean a passenger vehicle, a truck, a bus, or a motor home.

The vehicle 1 is driven by a drive unit. The drive unit can be an internal combustion engine, an electric motor or a combination thereof. A vehicle 1 which has both an electric motor and an internal combustion engine is referred to as a hybrid vehicle.

Particularly in the case of hybrid vehicles and vehicles that have an internal combustion engine, the energy storage module 10 can be provided as a starter battery.

Figure 2:
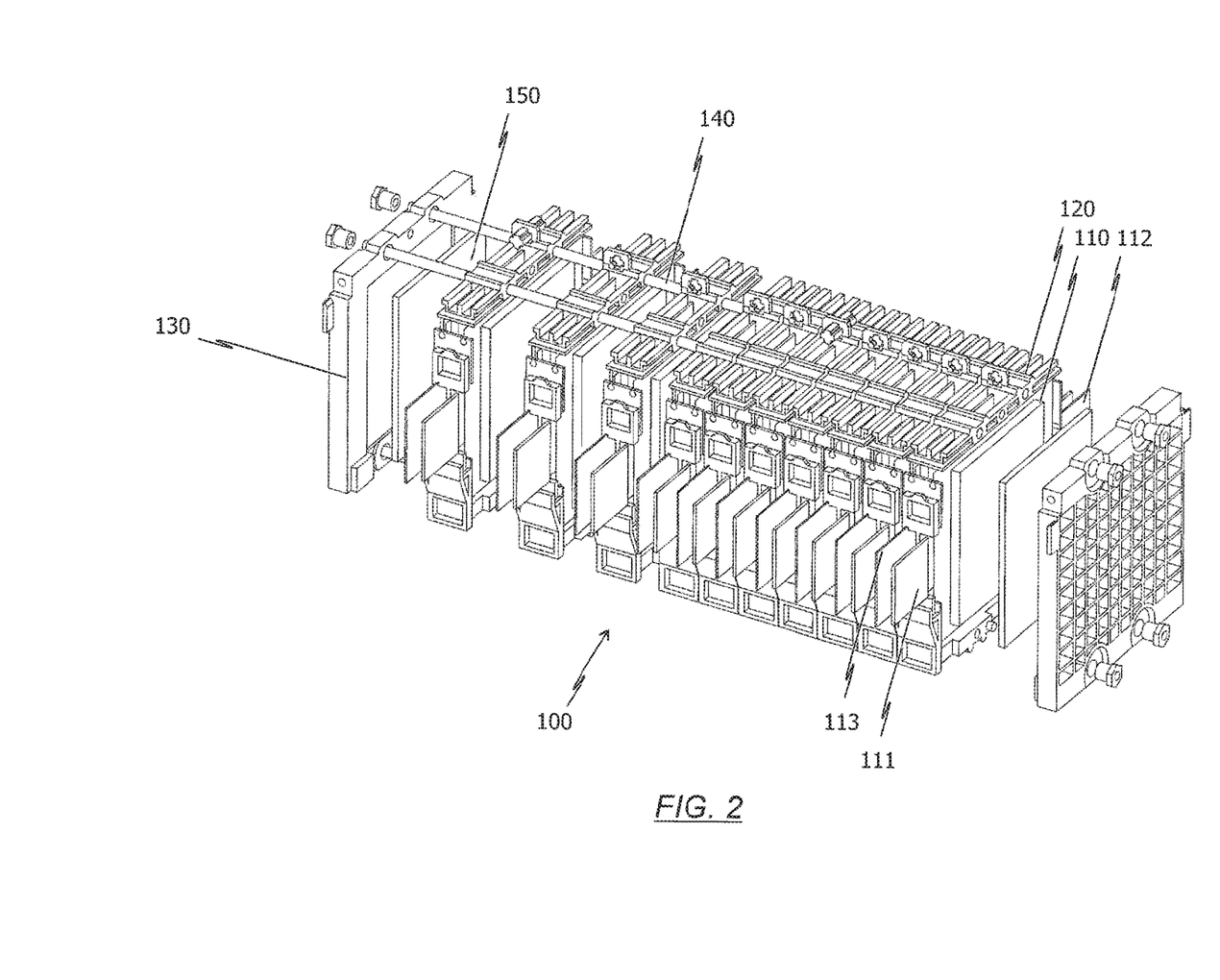
FIG. 2 shows a schematic representation of a cell pack according to the present invention.

FIG. 2 shows a cell pack 100 having a multiplicity of electrochemical cells 110 for use in the energy storage module 10 according to the invention. As shown in FIG. 2, the multiplicity of electrochemical cells 110 is arranged in cell carriers 120, wherein one cell carrier 120 receives two electrochemical cells 110. Here, the electrochemical cells 110 or the cell carriers 120 are arranged in such a way that first flat connection lugs 111 and second flat connection lugs 112 of the electrochemical cells 110 extend from two opposing sides of the cell pack 100. In particular, the two sides are the left-hand and the right-hand side of the cell pack.

Rods 140 are provided on an upper and a lower side, said rods being received by or passed through holes in the cell carriers 120. It is, of course, conceivable in this context for the holes or rods 140 to be provided only on the upper or the lower side of the cell pack 100.

End plates 130 are provided on a front and on a rear side of the cell pack 100, said end plates forming an end of the cell pack 100. The end plates 130 have associated holes, by which the rods 140 are received or through which they are passed. Foam plates 150 are arranged between the end plates 130 and a first or last cell carrier 120.

As can likewise be seen in FIG. 2, the end plates 130 each have a recess, which is designed in such a way in its shape and size that it can receive the foam plate 150, at least in some region or regions. It is preferably possible to provide the recess and/or the foam plate 150 with an adhesive device, e.g. adhesive strips.

Figure 3A:
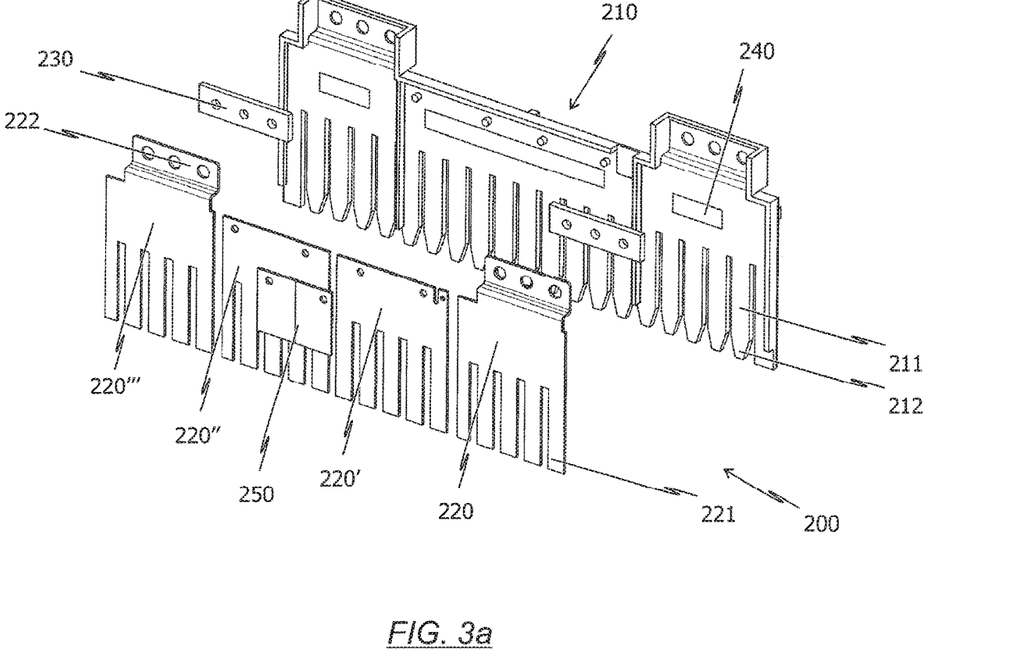
FIG. 3a shows an exploded drawing of a contacting device according to the present invention.

FIG. 3a shows an exploded drawing of a contacting device 200 according to the invention. The contacting device 200 has a carrier 210 and four busbars 220, 220', 220" and 220'". It is, of course, conceivable in this context for a different number of busbars 220 to be provided.

The carrier 210 has a multiplicity of teeth 211, which have chamfered end regions 212. It can furthermore be seen that the carrier 210 has centering devices in the form of knobs or pins, which can be received at least in associated holes in the two central busbars 220', 220".

The carrier 210 has three regions, which are separated by webs and thus provides three regions for the defined reception of the busbars 220, 220', 220" and 220'". In this case, a front busbar 220 is accommodated in a front region, the two central busbars 220' and 220'" are accommodated in a central region, and a rear busbar 220'" is accommodated in a rear region. Here too, relative terms such as "front" and "rear" refer to an installed state of the cell pack or of the energy module.

The front region and the rear region of the carrier 210 have regions to enable a connection region 223 of the front and rear busbars 220 and 220'" to be received.

Moreover, each of the regions of the carrier 210 can have an adhesive strip 240 to enable the busbars 220, 220', 220" and 220'" to be connected to the carrier 210, i.e. to be secured thereon.

The busbars 220 shown in FIG. 3a each have a multiplicity of teeth 221. Moreover, the busbars 220 are manufactured from different materials. Thus, for example, the front busbar 220 is formed from aluminum, the adjoining, central busbar 220' is formed from copper, the other central busbar 220" is formed from aluminum, and the rear busbar 220'" is formed from copper.

To enable the central two busbars 220' and 220" to be connected in a preceding working step, a bimetallic plate 250 is preferably provided. The two materials aluminum and copper can be welded directly only with great effort, and therefore the bimetallic plate 250 is used, having a first side made of aluminum and a second side made of copper. Instead of welding the busbars 220' and 220" directly, the side of the bimetallic plate 250 which is made of aluminum is thus welded to busbar 220". In corresponding fashion the side of the bimetallic plate 250 which is formed from copper is welded to busbar 220'.

Threaded plates 230 are provided between the busbars 220 and the carrier 210. In particular, the region of the carrier 210 which receives the connection regions 223 of busbars 220 and 220'" is also designed to be able to receive the threaded plate 230.

Figure 3B:
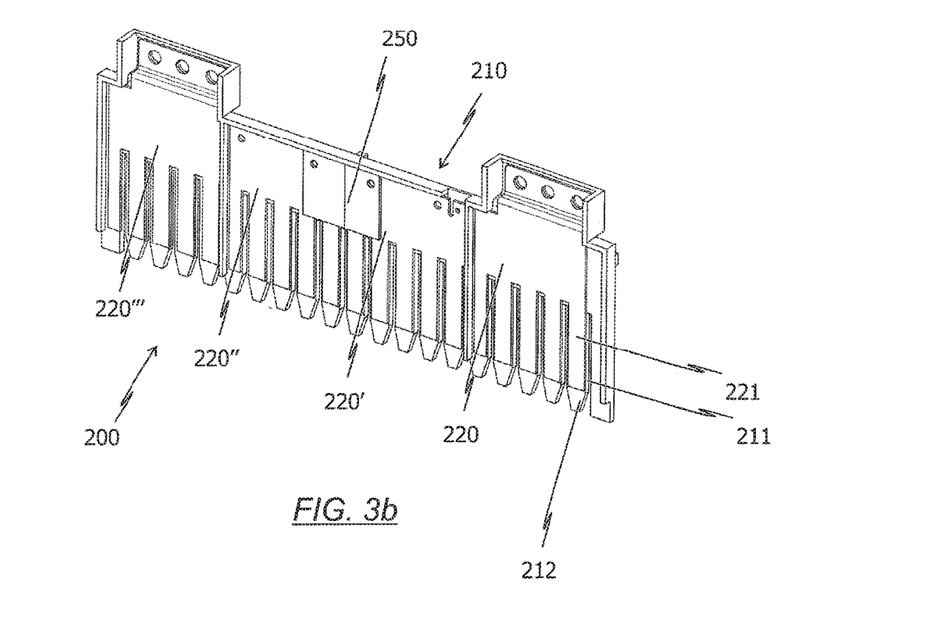

FIG. 3b shows the contacting device 200 shown in FIG. 3a in an assembled state. As can be seen, the busbars 220, 220', 220", 220'" are received in the carrier 210. In particular, it can also be seen that the teeth 211 of the carrier 210 are of longer design than the teeth 221 of the busbars 220, 220', 220" and 220'". This offers the advantage that only the teeth 211 of the carrier 210 have to have chamfered end regions 212. Accordingly, the busbars 220, 220', 220" and 220'" or the teeth 221 thereof are easier to produce.

It can furthermore be seen that the webs of the carrier between the front and the central and between the central and the rear region also serve to electrically isolate busbars 220 and 220' and busbars 220" and 220'", respectively, from one another.

Figure 4A:
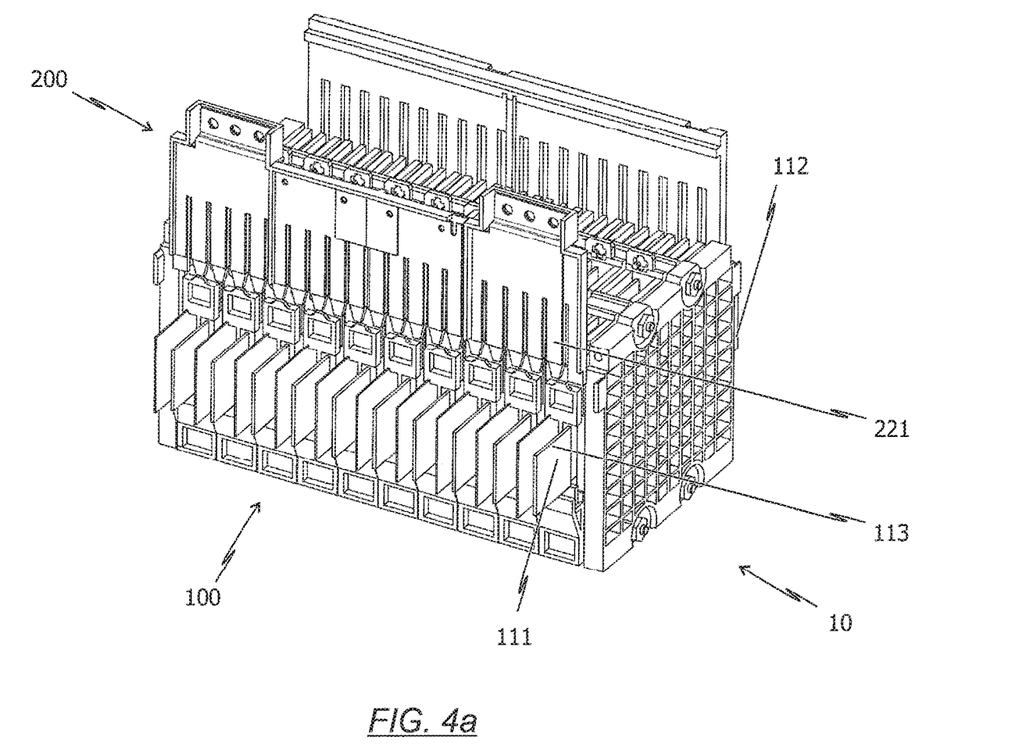
FIG. 4a shows a schematic representation of an energy storage module according to the present invention in a first state.
Figure 4B:
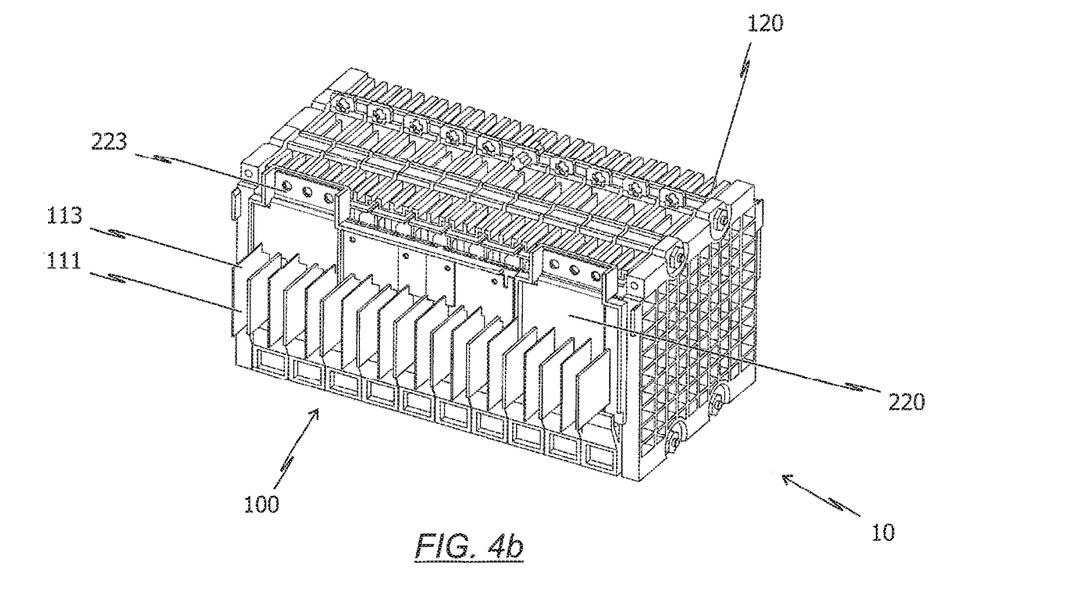
FIG. 4b shows a schematic representation of the energy storage module shown in FIG. 4a in a second state.
Figure 4C:
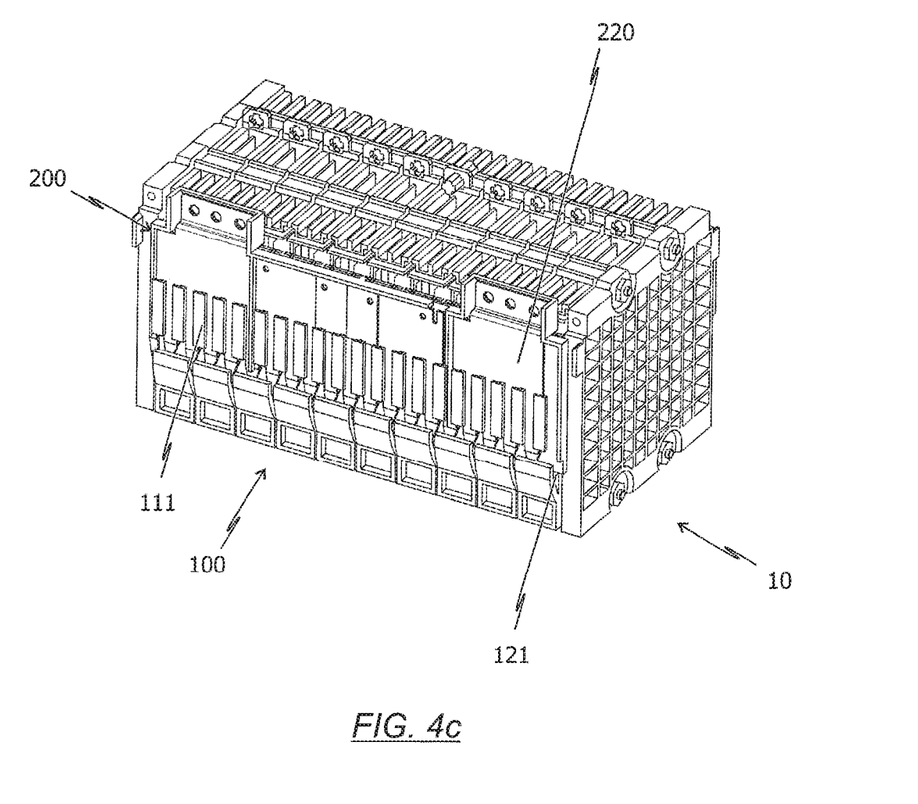
FIG. 4c shows a schematic representation of the energy storage module shown in FIG. 4a in a third state.

FIGS. 4a, 4b and 4c show the energy storage module 10 in different production steps (states).

Thus, FIG. 4a shows the cell pack 100 and two contacting devices 200 before the contacting devices 200 are pushed on.

FIG. 4b shows the cell pack 100 and the contacting devices 200 in a pushed-on or mounted state. It can be seen here that the two contacting devices 200 are not or do not have to be of identical design. In particular, it can be seen that only one of the contacting devices 200 has the connection regions 223 of busbar 220 and 220'''. Accordingly, the carrier 210 is formed either with or without regions for receiving the connection regions 223.

In FIG. 4a and FIG. 4b, the first and second flat connection lugs 111 and 112 still have a protective film 113, which is removed in an intermediate step between FIG. 4b and FIG. 4c. The protective film 113 serves, in particular, to protect the surface of the connection lugs 111 and 112.

In FIG. 4c it is possible to see the cell pack 100 and the contacting device 200, wherein the connection lugs 111 and 112 have been bent in such a way that they allow electric contact between the busbars 220, 220', 220" and 220"' and the electrochemical cells 110. In particular, it can also be seen that contact surfaces between the connection lugs 111 and 112 and the busbars 220, 220', 220" and 220"' are relatively large by virtue of the flat design of the connection lugs 111, 112.

In FIG. 4c it can furthermore be seen that a lower region of the cell carriers 120 is designed to form a gap 121, into which a welding tool can be inserted in a subsequent working step.

The cell pack 100 and, at that point, in particular the end plates 130 furthermore have centering devices, as can be seen in FIG. 4a to FIG. 4c. These can be seen, in particular, on the end plates 130 in the form of projections extending to the sides.

The contacting devices 200, in particular the carrier 210, also have centering devices, which are illustrated in the form of struts extending parallel to the teeth of the carrier, for example, in FIG. 4a.

Furthermore, as can likewise be seen in FIG. 4a, the carrier 210 has a kind of a rail in an upper region, allowing the cell carrier 120 to be secured in upper regions. This is, in particular, a latching device.

When considering FIG. 4b, it can furthermore be seen that the carrier 210 can be received in a lower region of the cell carriers 120. This lower region can simultaneously form a stop to ensure that the contacting devices 200 can be pushed onto the connection lugs 111 and 112 only as far as a particular position. In this case, the lower region of the cell carriers is, in particular, the same region in which the gap 121 is formed.

At this point it should be noted that all the parts described above, viewed on their own or in any combination, in particular the details shown in the drawings, are claimed as essential to the invention. Amendments thereof are entirely familiar to the person skilled in the art.

REFERENCE CHARACTER LIST 1 vehicle
10 energy storage module
100 cell pack
110 electrochemical cell
111 first flat connection lug
112 second flat connection lug
113 protective film
120 cell carrier
121 gap of the cell carrier
130 end plate
140 rods
150 foam plate
200 contacting device
210 carrier
211 teeth of the carrier
212 chamfered end region of the teeth
220 busbar
220' busbar
220" busbar
220"' busbar
212 teeth of the busbar
223 connection region
230 threaded plate
240 adhesive strip
250 bimetallic plate

The invention claimed is:

1. An energy storage module comprising:
a multiplicity of electrochemical cells for storing electric energy; and
at least one contacting device for electrically contacting the multiplicity of electrochemical cells, each of the multiplicity of electrochemical cells having a first flat connection lug for contacting a first electrode of the respective electrochemical cell and a second flat connection lug for contacting a second electrode of the respective electrochemical cell, the multiplicity of electrochemical cells being arranged in a stacked formation and forming a cell pack, the first and second flat connection lugs extending from two opposing sides of the cell pack the at least one contacting device including at least one busbar and at least one carrier, each one of the at least one busbar and the at least one carrier being at least in part comb-shaped and having a multiplicity of teeth, the multiplicity of teeth of the at least one carrier extending beyond the multiplicity of teeth of the at least one busbar, at least one of the first flat connection lug and the second flat connection lug being received between two adjacent teeth of the multiplicity of teeth of any one of the at least one bus bar and the at least one carrier.

2. The energy storage module of claim 1, wherein the energy storage module has two contacting devices, wherein a first contacting device of the two contacting devices makes contact with connection lugs on a first side of the two opposing sides of the cell pack, and wherein a second contacting device of the two contacting devices makes contact with connection lugs on a second side of the two opposing sides of the cell pack.

3. The energy storage module of claim 1, wherein each of the first and second flat connection lugs is received between two adjacent teeth of the at least one contacting device.

4. The energy storage module of claim 1, wherein the at least one busbar is received in the at least one carrier and is secured thereon.

5. The energy storage module of claim 1, wherein the at least one contacting device has a multiplicity of busbars and wherein the multiplicity of busbars has a first multiplicity of busbars made from a first material and a second multiplicity of busbars made from a second material, wherein the first material differs from the second material.

6. The energy storage module of claim 1, wherein any one of the at least one carrier and the at least one busbar has centering devices.

7. The energy storage module of claim 1, wherein the at least one busbar has a connection region for the electric contacting of an electric consuming unit.

8. The energy storage module of claim 1, wherein the multiplicity of teeth of the at least one carrier and the multiplicity of teeth of the at least one busbar have chamfered end regions.

9. The energy storage module of claim 8, wherein the multiplicity of teeth of the at least one carrier have chamfered end regions extending beyond chamfered end regions of the multiplicity of teeth of the at least one busbar when the at least one busbar is one of received in the at least one carrier and secured thereon.

10. The energy storage module of claim 1, wherein the at least one carrier has a multiplicity of holes and wherein the at least one busbar has a multiplicity of associated holes, wherein the holes in the carrier are in alignment with the holes in the busbar when the at least one busbar is one of received in the carrier and secured thereon.

11. The energy storage module of claim 10, wherein a threaded plate having a plurality of holes is arranged and aligned between the at least one carrier and the at least one busbar the holes in the threaded plate are being in alignment with the holes in the carrier and the holes in the busbar.

12. The energy storage module of claim 1, wherein the connection lugs of the multiplicity of electrochemical cells are flexible.

13. The energy storage module of claim 1, wherein the cell pack has cell carriers to receive the multiplicity of electrochemical cells and arrange them in a stacked formation.

14. The energy storage module of claim 13, wherein the cell pack has two end plates being provided at both ends of the electrochemical cells arranged in a stacked formation.

15. The energy storage module of claim 14, wherein the cell carriers have holes and wherein the end plates have associated holes arranged and in alignment with the holes in the cell carriers, wherein the cell pack furthermore has a multiplicity of rods arranged to pass through the holes in the cell carriers and in the end plates at least to connect the cell carriers and the end plates.

16. The energy storage module of claim 14, wherein a foam plate is in each case provided between an outer cell carrier and one of the end plates.

17. The energy storage module of claim 1, wherein the energy storage module furthermore has a module housing and a lid.

18. An energy storage module comprising:
a multiplicity of electrochemical cells for storing electric energy; and
at least one contacting device for electrically contacting the multiplicity of electrochemical cells, each of the multiplicity of electrochemical cells having a first flat connection lug for contacting a first electrode of the respective electrochemical cell and a second flat connection lug for contacting a second electrode of the respective electrochemical cell, the multiplicity of electrochemical cells being arranged in a stacked formation and forming a cell pack, the first and second flat connection lugs extending from two opposing sides of the cell pack, the at least one contacting device including at least one busbar and at least one carrier, each one of the at least one busbar and the at least one carrier being at least in part comb-shaped and having a multiplicity of teeth, the first flat connection lug and the second flat connection lug being received between two adjacent teeth of the multiplicity of teeth of any one of the at least one bus bar and the at least one carrier.

* * * * *

UNITED STATES PATENT AND TRADEMARK OFFICE
CERTIFICATE OF CORRECTION

| | |
|---|---|
| PATENT NO. | : 11,196,118 B2 |
| APPLICATION NO. | : 16/332787 |
| DATED | : December 7, 2021 |
| INVENTOR(S) | : Eisermann et al. |

It is certified that error appears in the above-identified patent and that said Letters Patent is hereby corrected as shown below:

In the Specification

In Column 7, Lines 29-30, delete "achieved, in accordance with claim 19," and insert -- achieved --, therefor.

In the Claims

In Column 12, Line 40, in Claim 1, delete "bus bar" and insert -- busbar --, therefor.

In Column 13, Line 20, in Claim 11, delete "busbar the holes in the threaded plate are" and insert -- busbar, the holes in the threaded plate --, therefor.

In Column 14, Line 32, in Claim 18, delete "bus bar" and insert -- busbar --, therefor.

Signed and Sealed this
Nineteenth Day of April, 2022

Katherine Kelly Vidal
*Director of the United States Patent and Trademark Office*